UNITED STATES PATENT OFFICE.

ARTHUR EICHENGRÜN, OF DÜSSELDORF, GERMANY, ASSIGNOR TO FARBENFABRIKEN VORM. FRIEDR. BAYER & CO., OF ELBERFELD, GERMANY, A CORPORATION OF GERMANY.

PARAFORMALDEHYDE AND PEROXID MIXTURE.

No. 866,850.      Specification of Letters Patent.      Patented Sept. 24, 1907.

Application filed June 2, 1906. Serial No. 319,964. (Specimens.)

*To all whom it may concern:*

Be it known that I, ARTHUR EICHENGRÜN, doctor of philosophy, chemist, a citizen of the German Empire, residing at Düsseldorf, Germany, Kingdom of Prussia, have invented new and useful Improvements in Paraformaldehyde and Peroxid Mixtures, of which the following is a specification.

My invention relates to new preparations generating gaseous formaldehyde by treating them with water. The new preparations are mixtures of metal peroxids having an alkaline reaction with polymeric formaldehyde e. g. paraformaldehyde or trioxymethylene. For this purpose peroxids, such as sodium peroxid $Na_2O_2$, barium peroxid $BaO_2$, strontium peroxid $SrO_2$, etc. are mixed e. g. with paraformaldehyde and subsequently water is added to this mixture. The mixtures of peroxids with the bodies giving off the formaldehyde may be pressed into pastils or larger pieces and in this form are ready to use. The new preparations are of great advantage for disinfecting by means of formaldehyde.

On employing sodium peroxid the reaction is so violent that the mixture takes fire and an explosion may even occur. In this case an indifferent product, such as sodium carbonate, or the like, must be added to the mixture to moderate the reaction. Good results are for instance attained on using 25 parts of a mixture containing 2½ parts of barium peroxid and one part of paraformaldehyde and from 15—20 parts of water. A lively evolution of gas ensues with disengagement of heat and after a short while a violent ebullition takes place and streams of formaldehyde and steam are given off which can be made use of for disinfecting closed rooms. On using a mixture of 3 parts of strontium peroxid, one part of paraformaldehyde and 20 parts of water a regular continuous evolution of formaldehyde can be produced with only slight disengagement of heat. The quantity of water used can be largely increased.

Having now described my invention and in what manner the same is to be performed, what I claim as new and desire to secure by Letters Patent is:—

1. A composition of matter generating gaseous formaldehyde and water vapor when treated with water, and consisting of a mixture of polymeric formaldehyde with metal peroxids having an alkaline reaction, substantially as hereinbefore described.

2. A composition of matter generating gaseous formaldehyde and water vapor when treated with water, and consisting of a mixture of paraformaldehyde with metal peroxids having an alkaline reaction, substantially as hereinbefore described.

3. A composition of matter generating gaseous formaldehyde and water vapor when treated with water, and consisting of a mixture of paraformaldehyde with barium peroxid, substantially as hereinbefore described.

In testimony whereof I have hereunto set my hand in the presence of two subscribing witnesses.

ARTHUR EICHENGRÜN.

Witnesses:
    OTTO KÖNIG,
    J. A. RITTERSHAUS.